(12) United States Patent
Owens

(10) Patent No.: US 7,350,342 B2
(45) Date of Patent: Apr. 1, 2008

(54) DECORATIVE ARTICLES FOR ANIMALS

(76) Inventor: Trudy A. Owens, 19368 Noll Rd. NE., Poulsbo, WA (US) 98370

(*) Notice: Subject to any disclaimer, the term of this patent is extended or adjusted under 35 U.S.C. 154(b) by 0 days.

(21) Appl. No.: 11/497,483

(22) Filed: Aug. 1, 2006

(65) Prior Publication Data

US 2006/0266303 A1 Nov. 30, 2006

Related U.S. Application Data

(63) Continuation-in-part of application No. 10/994,755, filed on Nov. 22, 2004, now Pat. No. 7,089,719.

(51) Int. Cl.
*B68B 1/04* (2006.01)
(52) U.S. Cl. .......................................................... 54/12
(58) Field of Classification Search .................... 54/12; 119/792, 856, 858; D11/6, 8, 11; 63/3, 3.1
See application file for complete search history.

(56) References Cited

U.S. PATENT DOCUMENTS

| | | | | | |
|---|---|---|---|---|---|
| 337,732 | A | * | 3/1886 | Beebee | ........................... 54/12 |
| 405,307 | A | * | 6/1889 | Fkyesm | ........................... 54/12 |
| 473,079 | A | * | 4/1892 | Pfiffner | ........................... 54/12 |
| 807,426 | A | * | 12/1905 | Fisher | ............................ 54/12 |
| D112,001 | S | * | 11/1938 | Solomon | ..................... D2/633 |
| 2,378,755 | A | * | 6/1945 | Dowling | ..................... 40/640 |
| 3,765,376 | A | * | 10/1973 | Higgins | ..................... 119/858 |
| 5,528,909 | A | * | 6/1996 | Tonakawa | ........................ 63/3 |
| 5,713,218 | A | * | 2/1998 | McCabe | ....................... 63/3.1 |
| 5,865,148 | A | * | 2/1999 | Aguirre et al. | ............. 119/856 |
| 6,094,939 | A | * | 8/2000 | Gavello | ........................... 63/3 |
| 6,748,903 | B1 | * | 6/2004 | Price et al. | .................. 119/858 |

* cited by examiner

*Primary Examiner*—Thomas Price
(74) *Attorney, Agent, or Firm*—Andrew L. Ney

(57) ABSTRACT

A decorative animal article, such as a collar or a leash, having a plurality of decorative components adhesively attached to a flexible band with lengths of thread extending through the decorative components from one end of the flexible band to the opposite end of the flexible band to provide added protection against the decorative components falling off the flexible band when, for example, the adhesive fails.

14 Claims, 1 Drawing Sheet

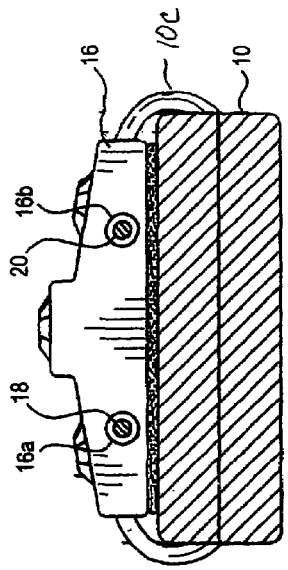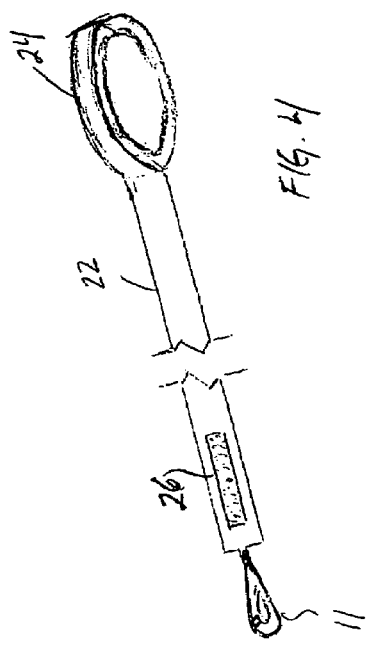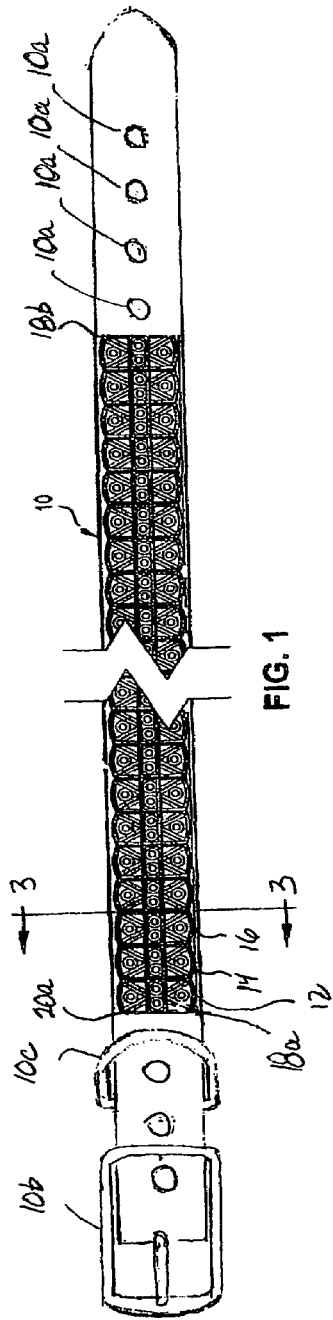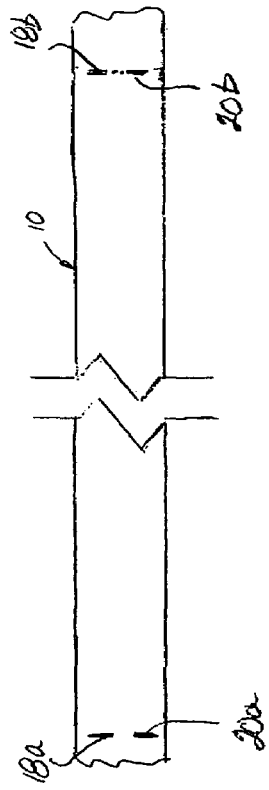

DECORATIVE ARTICLES FOR ANIMALS

CROSS-REFERENCE TO RELATED APPLICATIONS

The present application is a continuation-in-part and claims the benefit of U.S. non-provisional Patent Application 10/994,755 filed Nov. 22, 2004 now U.S. Pat. No. 7,089,719 which is expressly incorporated herein in its entirety by reference thereto.

FIELD OF THE INVENTION

The present invention relates, in general, to articles worn by or used with animals and, in particular, to articles such as the collars and leashes worn by or used with cats and dogs.

BACKGROUND OF THE INVENTION

Many, many owners of cats and dogs treat their pets in very special ways, by dressing them up with decorative articles such as fancy collars and leashes. Such decorative animal articles having, for example, glass beads or semi precious gems that typically are adhesively attached to a flexible band can be quite expensive.

Because the band of such a collar must be flexible to adapt to the curvature of the neck of the animal or the band of such a leash must be flexible to function effectively as a leash, there is a tendency for the decorative components to loosen or fall off the band when the adhesive fails as the band flexes. The result is a band of poor appearance (i.e., irregularly spaced voids along the band) and the loss of valuable items (i.e., decorative components lost as they fall off the band).

SUMMARY OF THE INVENTION

A decorative animal article, constructed in accordance with the present invention, includes a flexible band and a plurality of decorative components adhesively attached to the flexible band along a selected length of the flexible band. Each of the decorative components has a first through hole extending parallel to the length of the flexible band and aligned with the first through hole of an adjacent decorative component and a second through hole extending parallel to the length of the flexible band and aligned with the second through hole of an adjacent decorative component. A first length of thread extends from a first end of the selected length of the flexible band through the first through holes of the decorative components to a second end of the selected length of the flexible band and is anchored to the flexible band at the first end of the selected length of the flexible band and at the second end of the selected length of the flexible band. A second length of thread extends from the first end of the selected length of the flexible band through the second through holes of the decorative components to the second end of the selected length of the flexible band and is anchored to the flexible band at the first end of the selected length of the flexible band and at the second end of selected length of the flexible band.

Although the present invention will be described in connection with pet collars and leashes worn by or used with cats and dogs, it will be apparent that it has broader application and can be employed in other decorative articles worn by or used with other animals.

BRIEF DESCRIPTION OF THE DRAWINGS

FIG. 1 is a top view of a preferred embodiment of a pet collar constructed in accordance with the present invention.

FIG. 2 shows a portion of the bottom of the FIG. 1 pet collar.

FIG. 3 is a sectional view, on an enlarged scale, of the FIG. 1 pet collar taken along line 3-3 of FIG. 1.

FIG. 4 is a perspective view of a preferred embodiment of a pet leash constructed in accordance with the present invention.

DETAILED DESCRIPTION OF THE INVENTION

Referring to FIGS. 1, 2, and 3, a pet collar, constructed in accordance with the present invention, includes a flexible band 10 having a series of aligned belt holes 10a at a first end and a belt buckle 10b and a leash clip loop 10c at a second end. Leash clip loop 10c is adapted to receive a leash clip, such as the one shown in FIG. 4 and identified by reference numeral 11, in the usual manner. Flexible band 10 preferably is leather.

A pet collar, constructed in accordance with the present invention, also includes a plurality of decorative components 12, 14, 16 . . . that is adhesively attached to flexible leather band 10 along a selected length of the flexible leather band. As shown most clearly in FIG. 3, each decorative component (e.g., 16) has a first through hole (e.g., 16a) extending parallel to the length of flexible leather band 10 and aligned with the first through hole of an adjacent decorative component and a second through hole (e.g., 16b) extending parallel to the length of the flexible leather band and aligned with the second through hole of an adjacent decorative component.

A pet collar, constructed in accordance with the present invention, further includes first and second lengths of thread 18 and 20 by which the decorative components (e.g., 12, 14, 16) are secured to flexible leather band 10. A first length of thread 18 extends from a first end of the selected length of the flexible leather band 10 along which the decorative components are attached to the flexible leather band through the first through holes (e.g., 16a) of the decorative components to the second end of the of the selected length of the flexible leather band along which the decorative components are attached to the flexible leather band and a second length of thread 20 extends from the first end of the selected length of the flexible leather band along which the decorative components are attached to the flexible leather band through the second through holes (e.g., 16b) of the decorative components to the second end of the selected length of the flexible leather band along which the decorative components are attached to the flexible leather band. The lengths of thread 18 and 20 should be sufficiently strong to withstand the flexing of flexible leather band 10 and not break when the flexible leather band flexes. The first length of thread 18 and the second length of thread 20 can be metallic wire.

A first end 18a of the first length of thread 18 and a first end 20a of the second length of thread 20 are anchored to flexible leather band 10 at the first end of the selected length of the flexible leather band along which the decorative components (e.g., 12, 14, 16) are attached to the flexible leather band. A second end 18b of the first length of thread 18 and a second end 20b of the second length of thread 20 are anchored to flexible leather band 10 at the second end of the of the selected length of the flexible leather band along which the decorative components (e.g., 12, 14, 16) are attached to the flexible leather band.

The first length of thread 18 and the second length of thread 20 can be separate pieces of thread or, as illustrated, a single piece of thread. The single piece thread is indicated by the dotted line between thread lengths 18b and 20b in FIG. 2.

When the first length of thread 18 and the second length of thread 20 are a single piece of thread:

(a) the first end 18a of the single piece of thread extends through the thickness of flexible leather band 10 at the first end of the selected length of the flexible leather band along which the decorative components are attached to the flexible leather band and has a length that extends transverse to the length of the flexible leather band on the bottom surface of the flexible leather band as shown in FIG. 2, (b) the single piece of thread extends from the first end of the selected length of flexible leather band 10 along which the decorative components (e.g., 12, 14, 16) are attached to the flexible leather band through the first through holes (e.g., 16a) of the decorative components to the second end of the selected length of the flexible leather band along which the decorative components are attached to the flexible leather band, (c) the mid-section of the single piece of thread extends through the thickness of flexible leather band 10 at the second end of the selected length of the flexible leather band along which the decorative components are attached to the flexible leather band to the bottom surface of the flexible leather band and extends transverse to the length of the flexible leather band on the bottom surface of the flexible leather band as shown in FIG. 2, (d) the single piece of thread extends through the thickness of flexible leather band 10 to the top surface of the flexible leather band and through the second through holes (e.g., 16b) of the decorative components (e.g., 16, 14, 12) to the first end of the selected length of the flexible leather band along which the decorative components are attached to the flexible leather band, and (e) the second end 20a of the single length of thread extends through the thickness of flexible leather band 10 at the first end of the selected length of the flexible leather band along which the decorative components are attached to the flexible leather band to the bottom surface of the flexible leather band and extends transverse to the length of the flexible leather band as shown in FIG. 2.

The ends 18a and 20a of the single length of thread are bent against the bottom surface of flexible leather band 10 to secure the single length of thread to the flexible leather band.

When the first length of thread 18 and the second length of thread 20 are separate pieces:

(a) the first end 18a of the first length of thread 18 extends through the thickness of flexible leather band 10 and has a length that extends transverse to the length of the flexible leather band on the bottom surface of the flexible leather band as shown in FIG. 2, (b) the second end 18b of the first length of thread 18 extends through the thickness of flexible leather band 10 and has a length that extends transverse to the length of the flexible leather band on the bottom surface of the flexible leather band as shown in FIG. 2.

(c) the first end 20a of the second length of thread 20 extends through the thickness of flexible leather band 10 and has a length that extends transverse to the length of the flexible leather band on the bottom surface of the flexible leather band as shown in FIG. 2, and (d) the second end 20b of the second length of thread 20 extends through the thickness of flexible leather band 10 and has a length that extends transverse to the length of the flexible leather band on the bottom surface of the flexible leather band a shown in FIG. 2.

The ends 18a, 20a and 18b, 20b of the separate lengths of thread are bent against the bottom surface of flexible leather band 10 to secure the two lengths of thread to the flexible leather band.

Referring to FIG. 4, a pet leash, constructed in accordance with the present invention, includes a leash clip 11, a leash lead 22, and a leash grip 24. The FIG. 4 pet leash further includes a plurality of decorative components, identified by reference numeral 26, that extends along a selected length of leash lead 22 on one or both sides and is adhesively attached to the leash lead and secured to the leash lead by threads in a manner previously described in connection with the pet collar illustrated by FIGS. 1, 2, and 3.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A decorative animal article comprising:

a flexible band;

a plurality of decorative components adhesively attached to said flexible band along a selected length of said flexible band with each of said decorative components having (a) a first through hole extending parallel to the length of said flexible band and aligned with the first through hole of an adjacent decorative component, and (b) a second through hole extending parallel to the length of said flexible band and aligned with the second through hole of an adjacent decorative component;

a first length of thread:

(a) extending from a first end of said selected length of said flexible band along which said decorative components are attached to said flexible band through said first through holes of said decorative components to a second end of said selected length of said flexible band along which said decorative components are attached to said flexible band, and (b) anchored to said flexible band at said first end of selected length of said flexible band along which said decorative components are attached to the flexible band and at said second end of selected length of said flexible band along which said decorative components are attached to said flexible band; and a second length of thread:

(a) extending from said first end of said selected length of said flexible band along which said decorative components are attached to said flexible band through said second through holes of said decorative components to said second end of said selected length of said flexible band along which said decorative components are attached to said flexible band, and (b) anchored to said flexible band at said first end of said selected length of said flexible band along which said decorative components are attached to said flexible band and at said second end of said selected length of said flexible band along which said decorative components are attached to said flexible band.

2. A decorative animal article according to claim 1 wherein said flexible band is leather.

3. A decorative animal article according to claim 2 wherein:
(a) said first length of thread and said second length of thread are separate pieces,
(b) a first end of said first length of thread and a first end of said second length of thread extend through the thickness of said flexible band at said first end of said selected length of said flexible band along which said decorative components are attached to said flexible band from the surface of said flexible band to which said decorative components are attached to an opposite surface of said flexible band, and,
(c) a second end of said first length of thread and a second end of said second length of thread extend through the thickness of said flexible band at said second end of said selected length of said flexible band along which said decorative components are attached to said flexible band from said surface of said flexible band to which said decorative components are attached to said opposite surface of said flexible band.

4. A decorative animal article according to claim 3 further including a series of aligned belt holes at a first end of said flexible band and a belt buckle at a second end of said flexible band.

5. A decorative animal article according to claim 1 wherein said first length of thread is a metallic wire and said second length of thread is a metallic wire.

6. A decorative animal article according to claim 5 wherein said first length of thread and said second length of thread are a single piece of thread having:
(a) a first end and a second end each extending through the thickness of said flexible band at said first end of said selected length of said flexible band along which said decorative components are attached to said flexible band from the surface of said flexible band to which said decorative components are attached to an opposite surface of said flexible band, and,
(b) a mid-section extending through the thickness of said flexible band at said second end of said selected length of said flexible band along which said decorative components are attached to said flexible band from the surface of said flexible band to which said decorative components are attached to said opposite surface of said flexible band.

7. A decorative animal article according to claim 6 further including a series of aligned belt holes at a first end of said flexible band and a belt buckle at a second end of said flexible band.

8. A decorative animal article according to claim 5 wherein:
(a) said first length of metallic wire and said second length of metallic wire are separate pieces,
(b) a first end of said first length of metallic wire and a first end of said second length of metallic wire extend through the thickness of said flexible band at said first end of said selected length of said flexible band along which said decorative components are attached to said flexible band from the surface of said flexible band to which said decorative components are attached to an opposite surface of said flexible band, and,
(c) a second end of said first length of metallic wire and a second end of said second length of metallic wire extend through the thickness of said flexible band at said second end of said selected length of said flexible band along which said decorative components are attached to said flexible band from said surface of said flexible band to which said decorative components are attached to said opposite surface of said flexible band.

9. A decorative animal article according to claim 8 further including a series of aligned belt holes at a first end of said flexible band and a belt buckle at a second end of said flexible band.

10. A decorative animal article according to claim 1 wherein said first length of thread and said second length of thread are a single piece of thread having:
(a) a first end and a second end each extending through the thickness of said flexible band at said first end of said selected length of said flexible band along which said decorative components are attached to said flexible band from the surface of said flexible band to which said decorative components are attached to an opposite surface of said flexible band, and,
(b) a mid-section extending through the thickness of said flexible band at said second end of said selected length of said flexible band along which said decorative components are attached to said flexible band from said surface of said flexible band to which said decorative components are attached to said opposite surface of said flexible band.

11. A decorative animal article according to claim 10 further including a series of aligned belt holes at a first end of said flexible band and a belt buckle at a second end of said flexible band.

12. A pet collar comprising:
a flexible band having a series of aligned belt holes at a first end of said flexible belt;
a belt buckle at a second end of said flexible band;
a plurality of decorative components adhesively attached to said flexible band along a selected length of said flexible band with each of said decorative components having (a) a first through hole extending parallel to the length of said flexible band and aligned with the first through hole of an adjacent decorative component, and (b) a second through hole extending parallel to the length of said flexible band and aligned with the second through hole of an adjacent decorative component;
a first length of thread:
(a) extending from a first end of said selected length of said flexible band along which said decorative components are attached to said flexible band through first through holes of said decorative components to a second end of said selected length of said flexible band along which said decorative components are attached to said flexible band, and
(b) anchored to said flexible band at said first end of selected length of said flexible band along which said decorative components are attached to said flexible band and at said second end of selected length of said flexible band along which said decorative components are attached to said flexible band; and
a second length of thread:
(a) extending from said first end of said selected length of said flexible band along which said decorative components are attached to said flexible band through said second through holes of said decorative components to said second end of said selected length of said flexible band along which said decorative components are attached to said flexible band, and
(b) anchored to said flexible band at said first end of said selected length of said flexible band along which said decorative components are attached to said flexible band and at said second end of said selected length of said flexible band along which said decorative components are attached to said flexible band.

13. A pet collar according to claim 12 further including a leash clip loop at said second end of said flexible band.

14. A pet leash comprising:
   a leash lead;
   a leash clip at a first end of said leash lead;
   a leash grip at a second end of said leash lead;
   a plurality of decorative components adhesively attached to said leash lead along a selected length of said leash lead with each of said decorative components having (a) a first through hole extending parallel to the length of said leash lead and aligned with the first through hole of an adjacent decorative component, and (b) a second through hole extending parallel to the length of said leash lead and aligned with the second through hole of an adjacent decorative component;
   a first length of thread:
   (a) extending from a first end of said selected length of said leash lead along which said decorative components are attached to said leash lead through said first through holes of said decorative components to a second end of said selected length of said leash lead along which decorative components are attached to said leash lead, and
   (b) anchored to said leash lead at said first end of selected length of said leash lead along which said decorative components are attached to said leash lead and at said second end of selected length of said leash lead along which said decorative components are attached to said leash lead; and a second length of thread:
   (a) extending from said first end of said selected length of said leash lead along which said decorative components are attached to said leash lead through said second through holes of said decorative components to said second end of said selected length of said leash lead along which said decorative components are attached to said leash lead, and
   (b) anchored to said leash lead at said first end of selected length of said leash lead along which said decorative components are attached to said leash lead and at said second end of selected length of said leash lead along which said decorative components are attached to said leash lead.

* * * * *